US012529488B2

(12) United States Patent
Lee et al.

(10) Patent No.: US 12,529,488 B2
(45) Date of Patent: Jan. 20, 2026

(54) AIR CLEANER

(71) Applicant: LG ELECTRONICS INC., Seoul (KR)

(72) Inventors: Kunyoung Lee, Seoul (KR); Taesan Kim, Seoul (KR); Bohyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 337 days.

(21) Appl. No.: 18/221,152

(22) Filed: Jul. 12, 2023

(65) Prior Publication Data

US 2024/0019142 A1 Jan. 18, 2024

(30) Foreign Application Priority Data

Jul. 14, 2022 (KR) ........................ 10-2022-0087010

(51) Int. Cl.

| | |
|---|---|
| ***F24F 8/10*** | (2021.01) |
| ***B01D 46/00*** | (2022.01) |
| ***F24F 8/108*** | (2021.01) |
| ***F24F 13/20*** | (2006.01) |

(52) U.S. Cl.

CPC .......... *F24F 8/108* (2021.01); *B01D 46/0005* (2013.01); *B01D 46/0086* (2013.01); *F24F 13/20* (2013.01)

(58) Field of Classification Search

CPC . B01D 46/00; B01D 46/0002; B01D 46/0005

See application file for complete search history.

(56) References Cited

U.S. PATENT DOCUMENTS

| | | | |
|---|---|---|---|
| 8,414,670 | B2 | 4/2013 | Lee |
| 2011/0037368 | A1 | 2/2011 | Huang |
| 2015/0108364 | A1 | 4/2015 | Hanai et al. |
| 2015/0231542 | A1 | 8/2015 | Wennerstrom et al. |

(Continued)

FOREIGN PATENT DOCUMENTS

| | | |
|---|---|---|
| CN | 101808712 | 8/2010 |
| CN | 104329748 | 2/2015 |

(Continued)

OTHER PUBLICATIONS

Extended European Search Report dated Nov. 16, 2023 issued in Application No. 23185149.4.

(Continued)

*Primary Examiner* — Robert A Hopkins
(74) *Attorney, Agent, or Firm* — KED & ASSOCIATES, LLP

(57) ABSTRACT

An air cleaner according to the present disclosure includes: a first body having an inlet and an outlet; a filter disposed inside the first body and facing the inlet; a blower fan disposed between the inlet and the outlet inside the first body; a blower motor disposed inside the first body and configured to rotate the blower fan; and a second body coupled to an upper side of the first body and extending along a lateral direction, wherein the second body includes an indicator configured to display an operation state, wherein the indicator has a lamp configured to emit light and a lamp housing in which the lamp is disposed, and wherein the lamp housing has a groove to allow light emitted by the lamp to pass through.

18 Claims, 8 Drawing Sheets

(56) References Cited

U.S. PATENT DOCUMENTS

| | | | |
|---|---|---|---|
| 2015/0273376 | A1 | 10/2015 | Sohn et al. |
| 2017/0122583 | A1 | 5/2017 | Lee et al. |
| 2017/0248153 | A1 | 8/2017 | Park et al. |
| 2018/0001248 | A1 | 1/2018 | Jung et al. |
| 2019/0226698 | A1 | 7/2019 | Kim et al. |
| 2020/0289968 | A1 | 9/2020 | Scholten et al. |
| 2020/0298160 | A1 | 9/2020 | Jeon et al. |
| 2020/0298165 | A1 | 9/2020 | Kang et al. |
| 2021/0207847 | A1 | 7/2021 | Lee et al. |
| 2021/0387125 | A1 | 12/2021 | Scholten et al. |
| 2022/0032222 | A1 | 2/2022 | Park et al. |
| 2022/0154953 | A1 | 5/2022 | Herskovitz et al. |
| 2022/0184542 | A1 | 6/2022 | Kim et al. |
| 2022/0184543 | A1 | 6/2022 | Choi et al. |

FOREIGN PATENT DOCUMENTS

| | | | |
|---|---|---|---|
| CN | 206944336 | | 1/2018 |
| CN | 109405123 | | 3/2019 |
| CN | 210624810 | | 5/2020 |
| CN | 112013489 | | 12/2020 |
| CN | 212746822 | | 3/2021 |
| CN | 213454087 | U * | 8/2021 |
| CN | 113623807 | | 11/2021 |
| CN | 113465085 | | 12/2021 |
| CN | 216409143 | | 4/2022 |
| CN | 216409243 | | 4/2022 |
| CN | 114484709 | | 5/2022 |
| CN | 114521224 | | 5/2022 |
| CN | 114526534 | | 5/2022 |
| CN | 216744764 | | 6/2022 |
| EP | 3832217 | | 6/2021 |
| GB | 2286978 | | 9/1995 |
| JP | 2006-320447 | | 11/2006 |
| JP | 2007-127909 | | 5/2007 |
| JP | 2014-202384 | | 10/2014 |
| JP | 2022-025054 | | 2/2022 |
| KR | 10-2016-0025975 | | 3/2016 |
| KR | 10-1652363 | | 9/2016 |
| KR | 10-2017-0051276 | | 5/2017 |
| KR | 10-2017-0131734 | | 11/2017 |
| KR | 10-2018-0065164 | | 6/2018 |
| KR | 10-1867084 | | 6/2018 |
| KR | 10-2019-0119564 | | 10/2019 |
| KR | 10-2019-0137048 | | 12/2019 |
| KR | 10-2020-0004167 | | 1/2020 |
| KR | 10-2139575 | | 7/2020 |
| KR | 20-2020-0002055 | | 9/2020 |
| KR | 10-2020-0111895 | | 10/2020 |
| KR | 10-2021-0105856 | | 8/2021 |
| KR | 10-2289453 | | 8/2021 |
| KR | 10-2021-0110427 | | 9/2021 |
| KR | 10-2021-0137720 | | 11/2021 |
| KR | 10-2021-0140930 | | 11/2021 |
| KR | 10-2022-007355 | | 1/2022 |
| KR | 10-2022-0007363 | | 1/2022 |
| KR | 10-2022-0007993 | | 1/2022 |
| KR | 10-2022-0018766 | | 2/2022 |
| KR | 10-2022-0018994 | | 2/2022 |
| KR | 10-2022-0022038 | | 2/2022 |
| KR | 10-2022-0059885 | | 5/2022 |
| KR | 10-2022-0076876 | | 6/2022 |
| WO | WO 2017/074128 | | 5/2017 |
| WO | WO 2017/146353 | | 8/2017 |
| WO | WO 2018/016883 | | 1/2018 |
| WO | WO 2021/246949 | | 12/2021 |
| WO | WO 2021/246950 | | 12/2021 |
| WO | WO-2021246950 | A1 * | 12/2021 ............. A47B 37/00 |

OTHER PUBLICATIONS

European Search Report dated Nov. 28, 2023, issued in Application No. 23185161.9.
European Search Report dated Dec. 1, 2023, issued in Application No. 23185203.9.
European Search Report dated Dec. 4, 2023, issued in Application No. 23185183.3.
U.S. Non-Final Office Action dated Feb. 20, 2024 issued in U.S. Appl. No. 18/221,200.
Korean Office Action dated Apr. 16, 2024 issued in Application No. 10-2022-0087019.
Korean Office Action dated Apr. 16, 2024 issued in Application No. 10-2022-0087018.
Korean Office Action dated Apr. 16, 2024 issued in Application No. 10-2022-0087017.
Korean Office Action dated Apr. 16, 2024 issued in Application No. 10-2022-0087016.
Korean Office Action dated Apr. 16, 2024 issued in Application No. 10-2022-0087015.
Korean Notice of Allowance dated Nov. 1, 2024, issued in Application No. 10-2022-0087014.
European Search Report dated Dec. 13, 2023 issued in Application No. 23185155.1.
European Search Report dated Feb. 13, 2024, issued in Application No. 23201527.1.
European Search Report dated Feb. 13, 2024, issued in Application No. 23202298.8.
Korean Office Action dated Apr. 21, 2024, issued in Application No. 10-2022-0128429.
Korean Office Action dated Apr. 21, 2024, issued in Application No. 10-2022-0130152.
European Search Report dated Dec. 7, 2023, issued in Application No. 23185181.7.
European Search Report dated Dec. 8, 2023, issued in Application No. 23185189.0.
European Search Report dated Dec. 7, 2023, issued in Application No. 23185186.6.
Korean Office Action dated Mar. 19, 2024, issued in Application No. 10-2022-0087012.
Korean Office Action dated Mar. 19, 2024, issued in Application No. 10-2022-0087014.
Korean Office Action dated Mar. 22, 2024 issued in Application No. 10-2022-0087011.
Korean Office Action dated Mar. 22, 2024 issued in Application No. 10-2022-0087010.
U.S. Appl. No. 18/221,031, filed Jul. 12, 2023.
U.S. Appl. No. 18/221,067, filed Jul. 12, 2023.
U.S. Appl. No. 18/221,110, filed Jul. 12, 2023.
U.S. Appl. No. 18/221,152, filed Jul. 12, 2023.
U.S. Appl. No. 18/221,200, filed Jul. 12, 2023.
U.S. Appl. No. 18/221,540, filed Jul. 13, 2023.
U.S. Appl. No. 18/221,556, filed Jul. 13, 2023.
U.S. Appl. No. 18/221,576, filed Jul. 13, 2023.
U.S. Appl. No. 18/221,589, filed Jul. 13, 2023.
U.S. Appl. No. 18/377,447, filed Oct. 6, 2023.
U.S. Appl. No. 18/378,256, filed Oct. 10, 2023.

* cited by examiner

AIR CLEANER

CROSS-REFERENCE TO RELATED APPLICATION(S)

This application claims priority under 35 U.S.C. § 119 to Korean Application No. 10-2022-0087010 filed in Korea on Jul. 14, 2022, whose entire disclosure(s) is/are hereby incorporated by reference.

BACKGROUND

1. Field

An air cleaner, and more particularly, an air cleaner capable of utilizing a top space of the air cleaner is disclosed herein.

2. Background

An air cleaner is a device that generates an air flow and filters the flowing air to improve the quality of indoor air in a certain space. An air cleaner may have a configuration in which an inlet is provided on one side, an outlet is provided on another side, and a filter is provided therein. The air cleaner may have the outlet at the top such that filtered air may be discharged upward and flow in into an indoor space. When the outlet is provided at the top, a fan for controlling a wind direction may be separately provided at the top to blow the filtered air to a long distance.

An air cleaner discussed in Korean Laid-Open Patent Publication No. 2021-0140930 includes a cylindrical body; an outlet that is open at the top of the body; an annular outlet grille provided with the outlet and defining a top or upper surface of the body; and an operating unit disposed on a flat surface surrounded by the annular outlet grille. Furthermore, the discussed air cleaner has an outlet that is provided on the top surface of the body, which is disadvantageous to utilize a top surface of the air cleaner. In addition, the operating unit is disposed at a central portion of the annular outlet, which makes it even more difficult to use the narrow flat surface of an upper end of the air cleaner.

A typical air cleaner may require a considerable volume in order to achieve air cleaning performance in a certain space, but since the large-volume air cleaner may occupy a significant portion of the space, the space utilization may be reduced accordingly. In order to increase the utilization of the space occupied by an air cleaner, another member having a storage space may be provided at the air cleaner. However, air discharged upward collides with the member and may not reach a long distance, which directly may lead to a decrease in performance of the air cleaner. Thus, there is a need for an air cleaner that can utilize the top space, while minimizing a reduction of the air quality performance.

The above reference is incorporated by reference herein where appropriate for appropriate teachings of additional or alternative details, features and/or technical background.

BRIEF DESCRIPTION OF THE DRAWINGS

Embodiments will be described in detail with reference to the following drawings in which like reference numerals refer to like elements, and wherein.

DETAILED DESCRIPTION

Figure 1:
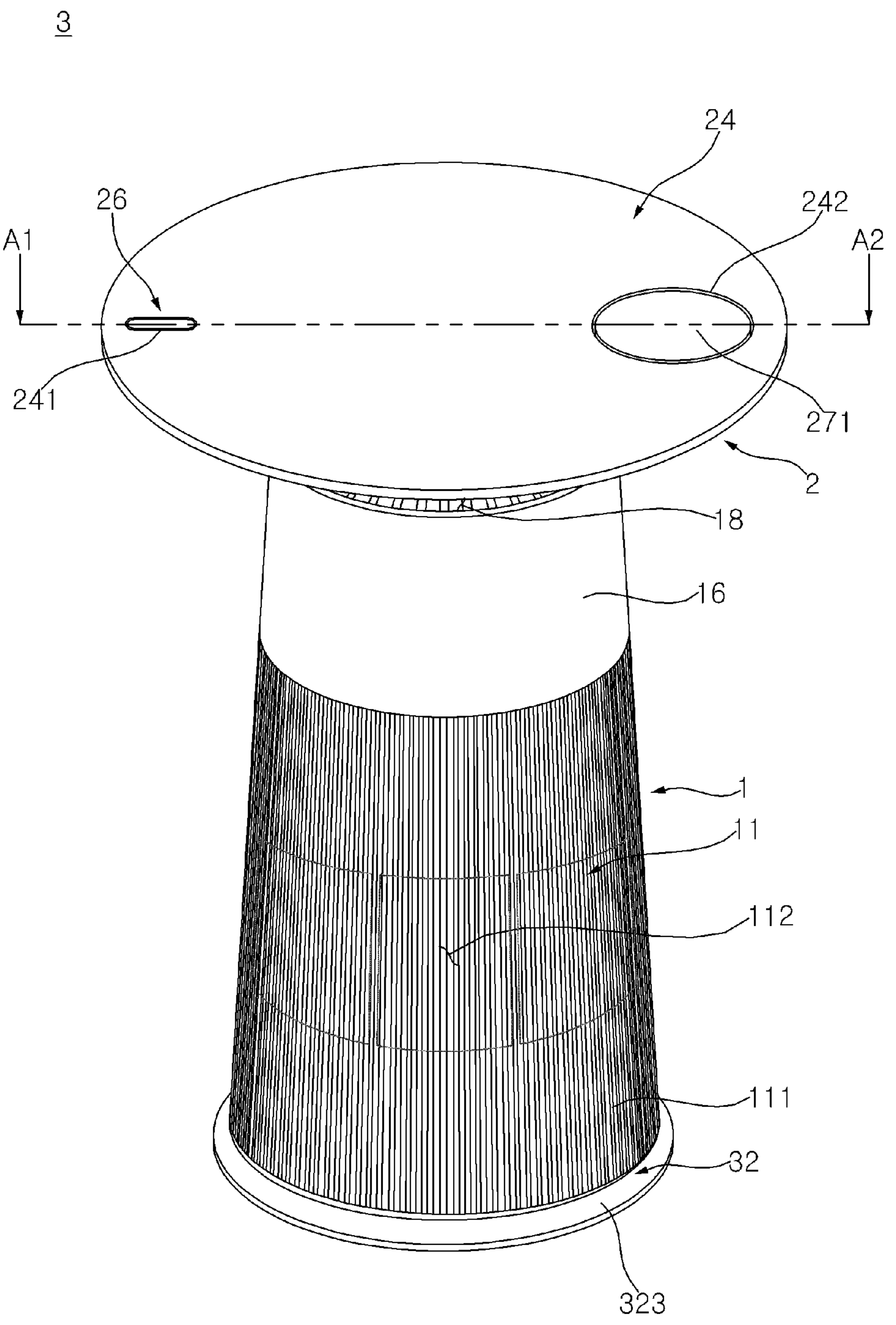
FIG. 1 is a perspective view of an air cleaner according to an embodiment of the present disclosure.

Description will now be given in detail according to exemplary embodiments disclosed herein, with reference to the accompanying drawings. For the sake of brief description with reference to the drawings, the same or equivalent components are provided with the same or similar reference numerals, and description thereof will not be repeated.

In the following description, a suffix such as “module” and “unit” may be used to refer to elements or components. Use of such a suffix herein is merely intended to facilitate description of the specification, and the suffix itself is not intended to give any special meaning or function.

In the present disclosure, that which is well known to one of ordinary skill in the relevant art has generally been omitted for the sake of brevity. The accompanying drawings are used to help easily understand the technical idea of the present disclosure and it should be understood that the idea of the present disclosure is not limited by the accompanying drawings. The idea of the present disclosure should be construed to extend to any alterations, equivalents, and substitutes besides the accompanying drawings.

It will be understood that although the terms “first”, “second”, etc. may be used herein to describe various elements, these elements should not be limited by these terms. These terms are only used to distinguish one element from another. As used herein, a singular representation is intended to include a plural representation unless the context clearly indicates otherwise.

It will be understood that when a component is referred to as being “connected to” or “coupled to” another component, it may be directly connected to or coupled to another component, or intervening components may be present. On the other hand, when a component is referred to as being “directly connected to” or “directly coupled to” another component, there are no intervening components present.

Hereinafter, aspects of an air cleaner 3 will be described with reference to FIG. 1. The air cleaner 3 may include a first body 1 having an inlet 112 and an outlet 17. The first body 1 may be elongated in a vertical direction, and the first body 1 may have greater height than width. For example, the first body 1 may have a substantially cylindrical or semi-conical shape elongated in a height direction.

The first body 1 may include a circumferential wall formed along its circumference. The first body 1 may include a top or upper surface defining an upper end of the circumferential wall. For example, the first body 1 may have a cylindrical shape elongated in a height direction, and may include a cylindrical circumferential wall.

It should be appreciated that the first body 1 may be formed in a cylindrical shape, a cuboid shape, a pyramid shape, or a cube shape. However, the shape of the first body 1 is not limited thereto and may have various shapes. The first body 1 may decrease in width toward the top to have a relatively narrower top. For example, the first body 1 may have a cylindrical shape whose width decreases upward.

The inlet 112 may be formed in the circumferential wall of the first body 1. In another example, the inlet 112 may be formed on a bottom surface of the first body 1. A portion of the circumferential wall of the first body 1 may be open to define the inlet 112. The inlet 112 may allow air from outside of the first body 1 to flow inside of the first body 1. For example, a portion of the circumferential wall of the first body 1 may be cut out such that the inside of the first body 1 communicates with the outside of the first body 1 via the inlet 112, allowing outside air to be supplied to the inside through the inlet 112.

The inlet 112 may be formed along a circumference of the circumferential wall of the first body 1. The inlet 112 may be formed on one side of the circumferential wall of the first body 1. A plurality of inlets 112 may be provided in the circumferential wall of the first body 1. For example, with respect to a center in a height direction of the first body 1, four inlets 112 may be open in all directions on the circumferential wall.

The inlet 112 may be disposed at a lower side or part of the first body 1. For example, the inlet 112 may be spaced downward from a center in a height direction of the first body 1, and may be formed by opening a portion of the circumferential wall. Accordingly, contaminated air with high density may be easily introduced into the air cleaner through the inlet disposed at the lower side of the first body 1.

The inlet 112 may be provided with a louver 111. The louver 111 may be disposed outside the inlet 112. The louver 111 may be formed along the circumference of the circumferential wall of the first body 1. The louver 111 may be elongated in a height direction of the first body 1. A plurality of louvers 111 may be disposed along the circumference of the circumferential wall. Air may flow through gaps between the plurality of louvers 111. For example, the louver 11 elongated in the height direction of the first body 1 may be provided in plurality disposed along the circumference of the circumferential wall of the first body 1, and outside air may be introduced into gaps formed between the plurality of louvers 111. Accordingly, larger dust or foreign particles carried in air introduced into the inlet 112 may be filtered out by the louver 111.

The inlet 1 may be formed on one side of the first body 1, and the outlet 17 may be formed on another side of the first body 1. The outlet 17 may be disposed to be spaced apart from the inlet 112. The inlet 112 may be open on one side, and the outlet 17 may be open on another side. For example, the inlet 112 may be open on the circumferential wall of the first body 1, and the outlet 17 may be open at the top of the first body 1.

The outlet 17 may be formed by opening the first body 1. The upper surface and the circumferential wall of the first body 1 may be open to define the outlet 17. The first body 1 may be open at the top to define a portion of the outlet 17. For example, the outlet 17 may be formed by the first body 1 being open at the top. As air is drawn into a lateral surface of the first body 1 and is then discharged upward, the discharged air may be prevented from being reintroduced into the inlet 112.

The outlet 17 may have the shape of a transverse section of the first body 1. The outlet 17 may be smaller than a cross-section of the transverse section of the first body 1. A portion of the upper surface of the first body 1 may be open to define the outlet 17. For example, the outlet 17 may be formed in an annular shape at the top of the first body 1 with a cylindrical shape.

The first body 1 may include a lower housing 11. The lower housing 11 may define a portion of the circumferential wall of the first body 1. The inlet 112 may be formed in a circumferential wall of the lower housing 11. The lower housing 11 may have a shape that is relatively narrow at the top and relatively wide at the bottom. The louver 111 may be disposed on the circumferential wall of the lower housing 11. The louver 111 may be disposed at the inlet 112 formed in the circumferential wall of the lower housing 11. For example, the lower housing 11 may include a circumferential wall that is provided with the inlet 112, and the louver 111 that extends in the height direction of the first body 1 and is disposed along the circumference of the circumferential wall.

The first body 1 may include an upper housing 16. The upper housing 16 may be a portion of the first body 1. An outlet grille 18 may be connected to the upper housing 16. For example, the upper housing 16 may define an upper portion of the first body 1, and the outlet grille 18 may be connected to an upper edge of the upper housing 16.

The air cleaner 3 may include a second body (also referred to as an air deflector or tabletop) 2 disposed over the first body 1. A top or upper surface of the second body 2 may be formed substantially flat. The second body 2 may have the shape of a table. For example, the second body 2 may have the shape of a table with a flat top surface. Accordingly, space utilization of the air cleaner 3 may be increased.

The second body 2 may cover the first body 1. The second body 2 may extend in a lateral direction. A width of the second body 2 may be greater than a width of the first body 1. An edge of the second body 2 may be located further outward from a center axis of the air cleaner 3 relative to the circumferential wall of the first body 1. For example, the second body 2 may be greater in width than the first body 1, and the second body 2 may have the shape of a circular or oval table with an upper edge located outward relative to the circumferential wall of the first body 1.

The second body 2 may include a top or upper surface. The upper surface of the second body 2 may be formed substantially flat. The second body 2 may include a plate (or top plate) 24 having a substantially flat surface. The plate 24 may cover the second body 2. For example, the plate 24 may be a disk that extends in the lateral direction to cover the second body 2.

The air cleaner 3 may include an indicator (or indicator light) 26. The indicator 26 may provide a user with information about the air cleaner 3. The indicator 26 may visually convey information about the air cleaner 3 to the user. For example, the indicator 26 may be a display that visually displays information regarding an operation state of the air cleaner 3.

The indicator 26 may be provided on one side of the air cleaner 3. The indicator 26 may be disposed at the second body 2. The indicator 26 may face upward. The indicator 26 may be disposed at the upper surface of the second body 2. The indicator 26 may be inserted into a slot 241 formed in the upper surface of the second body 2. For example, the indicator 26 may be elongated, and may be disposed at the slot 241 formed in the upper surface of the second body 2.

The air cleaner 3 may include a charging pad 271. The charging pad 271 may charge portable electronic devices. The charging pad 271 may wirelessly charge an electronic device without a connection terminal. For example, the charging pad 271 may be a wireless inductive charging module.

The charging pad 271 may be provided on one side of the air cleaner 3. The charging pad 271 may be disposed on one side of the second body 2. The charging pad 271 may be disposed at the upper surface of the second body 2. The charging pad 271 may define a section of the upper surface of the second body 2. The charging pad 271 may be inserted into a pad hole 242 formed in the second body 2. For example, the charging pad 271 may be inserted into the circular pad hole 242 formed in the upper surface of the second body 2 to thereby define a section of the upper surface of the second body 2.

The air cleaner 3 may include a base 32 to support the first body 1. The base 32 may support the weight of the air cleaner 3. The base 32 may support the weight of the first body 1 and the second body 2. The base 32 may be disposed at a bottom of the first body 1. The base 32 may define a lower end of the first body 1. A width of the base 32 may be greater than the width of the first body 1. An end of the base 32 may be located outward relative to the circumferential wall of the first body 1. For example, the first body 1 may have a shape that is narrow at the top and wide at the bottom, and the base 32 may be greater in width than the lower end of the first body 1.

The base 32 may extend laterally. The base 32 may include an inclined wall 323 inclined downward toward the outside. An edge of the inclined wall 323 may be located outward relative to the circumferential wall of the first body 1. Accordingly, stability of the air cleaner 3 may be improved.

Figure 2:
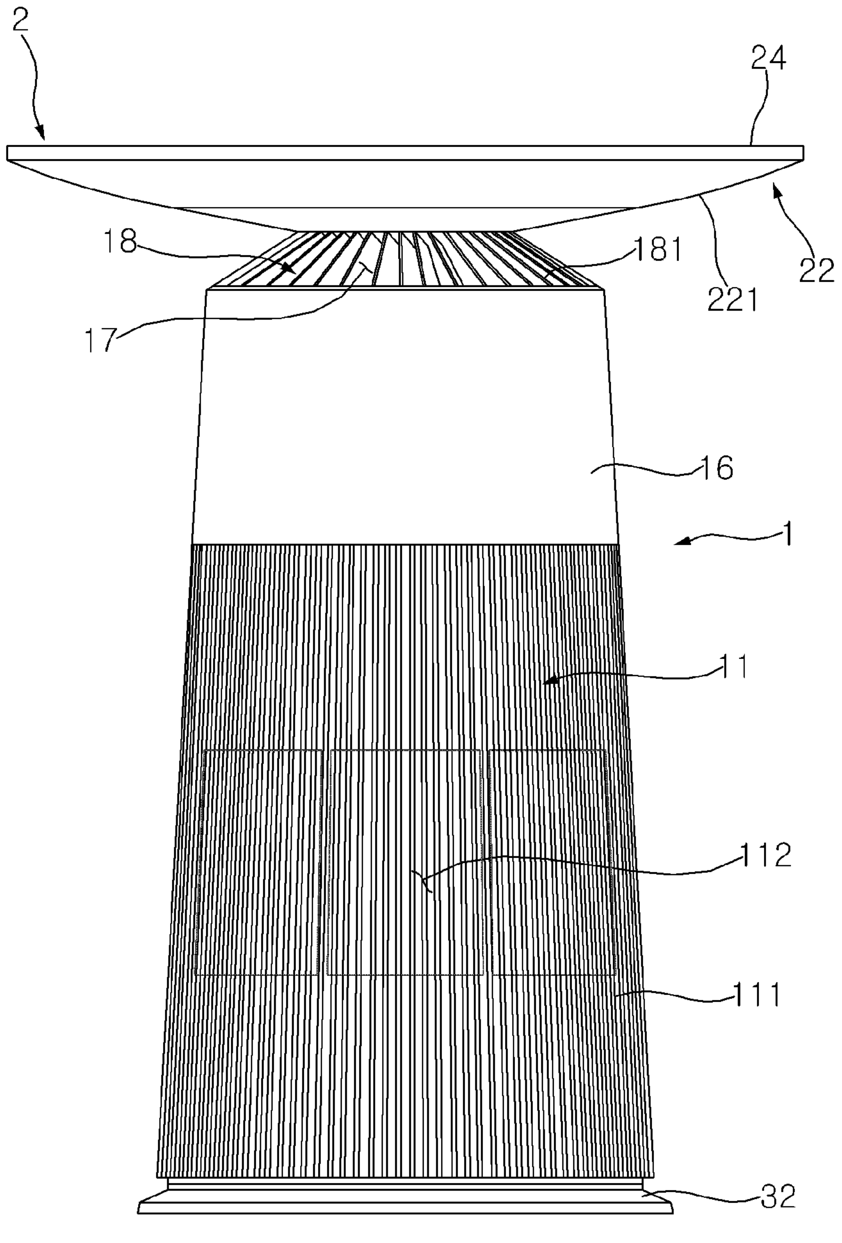
FIG. 2 is a side view of an air cleaner according to an embodiment of the present disclosure.

Referring to FIG. 2, aspects of the air cleaner 3 will be described below. The air cleaner 3 may include the outlet 17 that is open at the top. The outlet 17 may be disposed at a region between the first body 1 and the second body 2. The outlet 17 may be disposed at an upper end of the first body 1. The outlet 17 may be disposed to face the second body 2. The outlet 17 may be disposed to output air toward a bottom or lower surface of the second body 2. For example, the outlet 17 may be formed by opening the upper surface of the first body 1 and may face the lower surface of the second body 2. Accordingly, discharged air may flow along the lower surface of the second body 2, thereby preventing the discharged air from being reintroduced into the inlet 112.

The outlet 17 may be disposed obliquely. The outlet 17 may be positioned along a tilted surface. The outlet 17 may be tilted toward the outside of the first body 1. The outlet 17 may be inclined to one side from a connection point between the second body 2 and the first body 1. For example, the outlet 17 with an annular shape may be inclined downward toward the outside of the first body 1 from the connection portion between the first body 1 and the second body 2. Accordingly, discharged air may flow along the lower surface of the second body 2, thereby preventing the discharged air from being reintroduced into the inlet 112.

The outlet 17 may be formed in an annular shape. The outlet 17 may have the shape of a ring with respect to an axis of a blower fan 12. In other examples, the outlet 17 may have a circular shape, or the outlet 17 may have a quadrangular shape. The shape of the outlet 17 is not limited thereto, and may be formed in various shapes. For example, the outlet grille 18 may be disposed at an end of a flow path through which air is discharged, and the outlet 17 may have the shape of a rectangle provided between a plurality of vanes 181 disposed at the outlet grille 18. Accordingly, a discharge air flow may be generated in all directions, allowing the efficiency of the air cleaner to be increased.

The outlet 17 may be formed at an outlet cover. The outlet cover may be the outlet grille 18. For example, the outlet grille 18 may include a plurality of vanes 181, and the outlet 17 may be formed between the plurality of vanes 181. In another example, the outlet cover may be a plate having one or more holes defining the outlet 17.

The second body 2 may extend in the lateral direction. The second body 2 may include a lower cover 22 that defines an outer appearance of a bottom of the table. The lower cover 22 may extend in the lateral direction. The lower cover 22 may include a bottom or lower surface that extends laterally.

The lower cover 22 may decrease in thickness toward an end thereof. The lower surface of the lower cover 22 may be a guide wall 221. The guide wall 221 may extend in the lateral direction. The guide wall 221 may extend from the upper end of the first body 1 (e.g., adjacent to opening 17). The guide wall 221 may extend toward the outside of the first body 1. An edge of the guide wall 221 may be located outward relative to the circumferential wall of the first body 1.

The guide wall 221 may face downward. The guide wall may face the first body 1. The guide wall 221 may be inclined. For example, the guide wall 221 may extend upward toward the outside of the first body 1. The lower cover 22 may extend from one end of the outlet 17. The lower cover 22 may extend from one end of the outlet grille 18.

One end of the outlet grille 18 may be connected to the lower cover 22. The lower cover 22 may be spaced upward from another end of the outlet grille 18. The outlet 17 and the guide wall 221 may form an acute angle.

The outlet grille 18 and the guide wall 221 may be connected to each other. An upper end of the outlet grille 18 may be connected to a lower end of the guide wall 221. The outlet grille 18 and the guide wall 221 may form an acute angle. The guide wall 221 may extend from one side of the outlet grille 18, and the outlet grille 18 and the guide wall 221 may form an acute angle on the one side. The angle formed by the guide wall 221 and the outlet grille 18 may increase from the one side toward the edge of the guide wall 221. For example, the outlet grille 18 disposed at the top of the first body 1 may be connected to the second body 2, and the outlet grille 18 and the guide wall 221 of the second body 2 may form an acute angle at a connection point. The vane 181 may form an acute angle with the guide wall 221.

Figure 3:
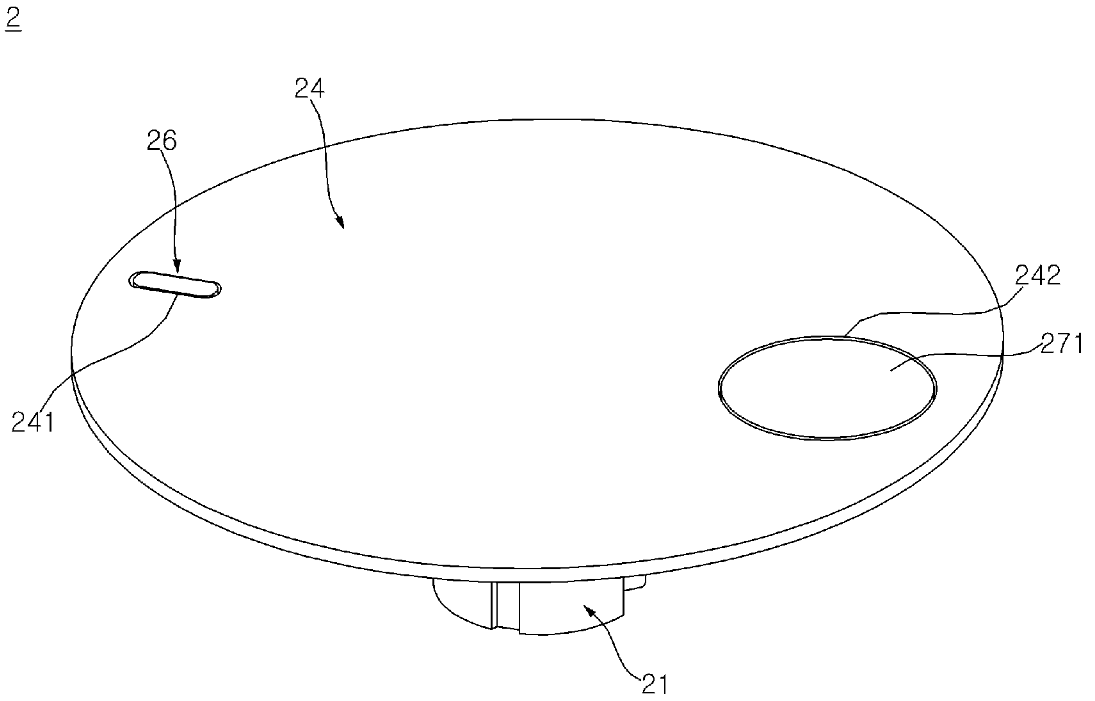
FIG. 3 is a perspective view of a second body according to an embodiment of the present disclosure.
Figure 4:
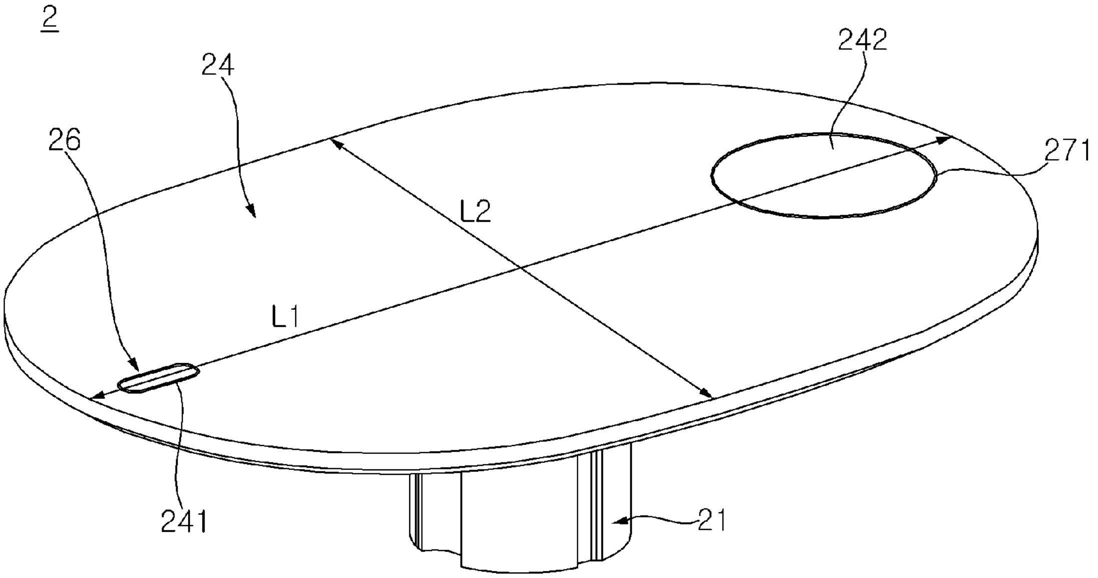
FIG. 4 is a perspective view of a second body according to an embodiment of the present disclosure.

Referring to FIGS. 3 and 4, aspects of the second body 2 will be described below. The second body 2 may include the plate 24 that defines the upper surface thereof. The plate 24 may have a flat surface on an upper end thereof. The plate 24 may be disposed over the lower cover 22. The plate 24 may be disposed on top of a post 21 extending downward from the lower cover 22. The plate 24 may be separated from the lower cover 22.

The plate 24 may include a top or upper surface. As shown in FIG. 4, the plate 24 may have an elliptical shape with a major axis (long axis) L1 and a minor axis (short axis) L2. As shown in FIG. 3, the upper surface of the plate 24 may have a circular shape whose major and minor axes L1 and L2 are equal in length. However, the shape of the plate 24 is not limited thereto and may be formed in various shapes such as an oval or rectangular shape to provide different storage and air deflection options.

The plate 24 may have the slot 241 into which the indicator 26 is inserted. The indicator 26 may be inserted from below into the slot 241. The indicator 26 may be exposed at the upper surface of the second body 2. The indicator 26 may define a section of the upper surface of the second body 2. For example, the plate 24 may have the corresponding slot 241 into which an indicator 26 extending to one side is inserted, and the indicator 26 may be inserted from a bottom of the plate 24 into the slot 241 and may be exposed to the outside from above plate 24.

The plate 24 may have the pad hole 242 into which the charging pad 271 is inserted. The charging pad 271 may be inserted from a bottom of the plate 24 into the pad hole 242. The charging pad 271 may be exposed at the upper surface of the second body 2. The charging pad 271 may define a section of the upper surface of the second body 2. For example, the charging pad 271 may have a circular shape, and the pad hole 242 may be formed in a circular shape corresponding to the charging pad 271, allowing the charging pad 271 to be inserted into the pad hole 242 so as to be exposed to the outside from above the plate 24.

The indicator 26 and the charging pad 271 may have different shapes. For example, the indicator 26 may have an elongated shape, and the charging pad 271 may have a circular shape. Due to the different shapes of the indicator and the charging pad, a coupling direction of the plate 24 may be easily identified by a user.

The indicator 26 and the charging pad 271 may be disposed at opposite positions. For example, the indicator 26 may be disposed adjacent to one end of the major axis L1, and the charging pad 271 may be disposed adjacent to an opposite end of the major axis L1. Accordingly, a coupling direction of the plate 24 may be guided through the indicator 26 and the charging pad 271.

Figure 5:
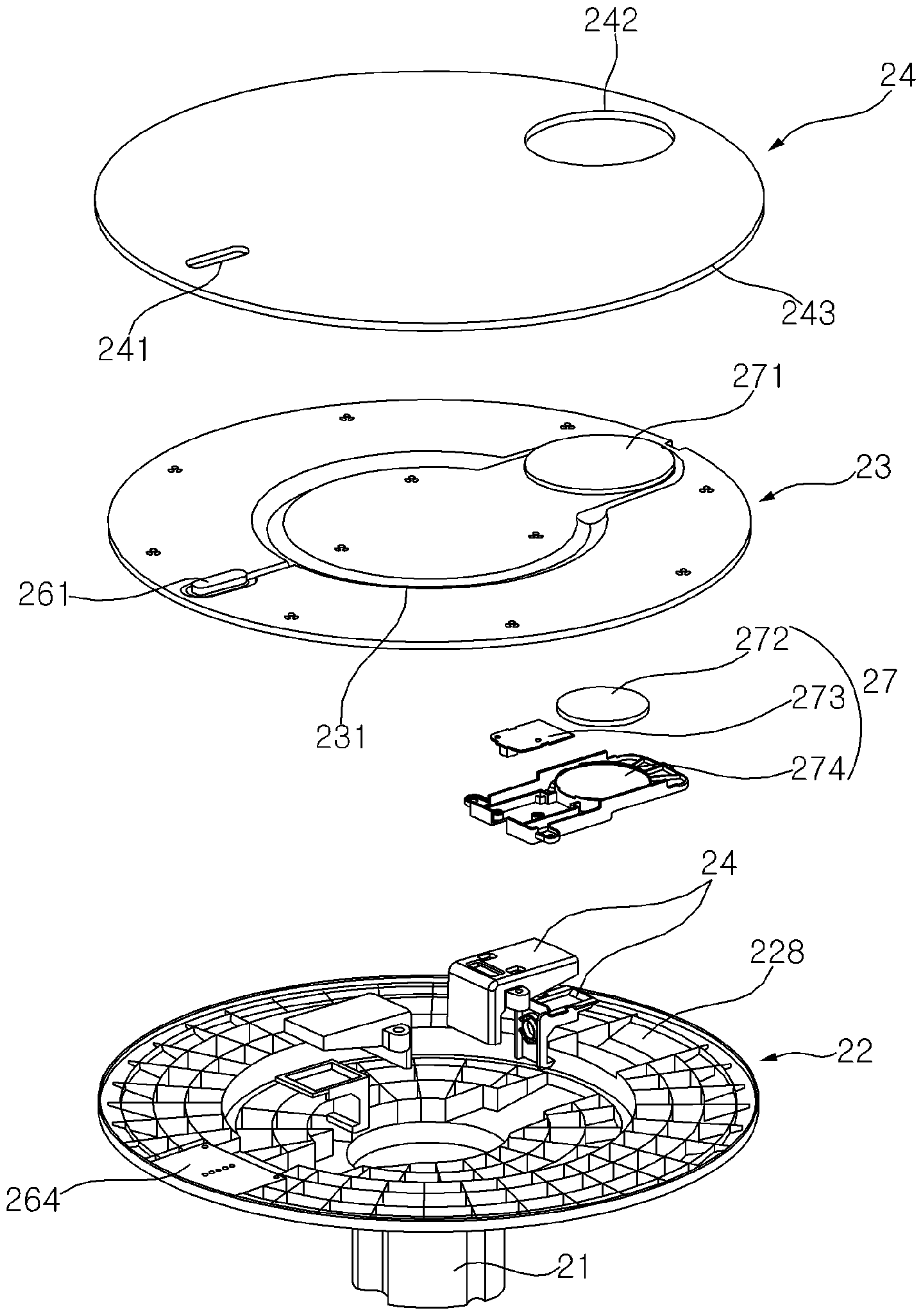
FIG. 5 is an exploded perspective view of a second body according to an embodiment of the present disclosure.

Referring to FIG. 5, aspects of the second body 2 will be described below. The second body 2 may include the lower cover 22. The lower cover 22 may define the outer appearance of a lower surface of a table. The lower cover 22 may include the post 21 that is configured to be coupled to the first body 1. The post 21 may extend downward, and the guide wall 221 of the lower cover 22 may extend laterally from the post 21.

An inside of the lower cover 22 may be partitioned by partition walls. A hook 28 may be coupled to the inside of the lower cover 22. The lower cover 22 may include a charging module installation portion (or charging module installation region) 228. The charging module installation portion 228 may be positioned in a direction radially opposite to a portion where the indicator 26 is installed relative to a center axis of the lower cover 22.

A charging module 27 may be provided inside the lower cover 22 and may include a charging coil 272 to generate an inductive charging field and a charging substrate 273 to provide power to the charging coil 272. The charging module 27 may include a charging case 274 in which the charging coil 272 and the charging substrate 273 are disposed. The charging module 27 may be disposed at a bottom of an upper plate (or intermediate plate) 23. The charging coil 272 may be disposed under the charging pad 271. The charging module 27 may be disposed at the charging module installation portion 228 of the lower cover 22. The charging module 27 may be disposed between the lower cover 22 and the upper plate 23.

The second body 2 may include the upper plate 23 disposed on top of the lower cover 22. The upper plate 23 may define a top or upper surface of the lower cover 22. The upper surface may cover the lower cover 22. A section of the upper plate 23 may be disposed inside the lower cover 22.

The upper plate 23 may include a lamp housing 261 and the charging pad 271. The charging pad 271 may be disposed on top of the charging coil 272. The charging pad 271 may be elevated from the upper plate 23. The lamp housing 261 may be elevated from the upper plate 23. The lamp housing 261 and the charging pad 271 may be opposite to each other in a radial direction of the upper plate 23 (e.g., along major axis L1).

A main water collection channel 231 may be disposed between the lamp housing 261 and the charging pad 271. The main water collection channel 231 may be connected to a slot water collection channel 232 formed along at least a portion of a circumference of the lamp housing 261. The main water collection channel 231 may be connected to a pad water collection channel 233 formed along at least a portion of a circumference of the charging pad 271.

The second body 2 may include the plate 24. The plate 24 may define the upper surface of the second body 2. The plate 24 may be disposed on top of the upper plate 23. The plate 24 may be disposed over the lower cover 22. The upper plate 23 may be disposed between the lower cover 22 and the plate 24.

The plate 24 may include the slot 241 into which the lamp housing 261 is inserted. The plate 24 may include the pad hole 242 into which the charging pad 271 is inserted. The lamp housing 261 and the pad hole 242 may be opposite to each other in a radial direction of the plate 24 relative to a center axis (e.g., along major axis L1). The plate 24 may include a lateral cover (or lateral cover wall) 243. The lateral cover 243 may be bent from a top surface of the plate 24 to extend downward. The lateral cover 243 may cover sides of the upper plate 23 and the lower cover 22 in the lateral direction.

Figure 6:
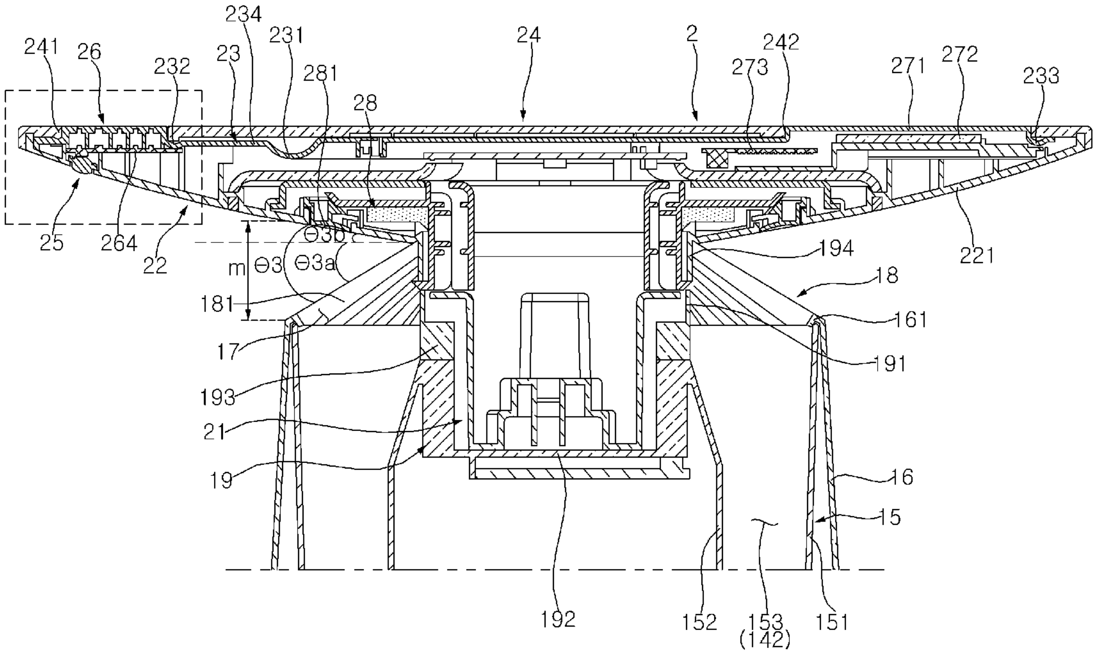
FIG. 6 is an elevational cross-sectional view taken along a line A1-A2 in FIG. 1.

Referring to FIG. 6, aspects of the air cleaner 3 will be described below. The outlet cover (e.g., outlet grille 18) may be disposed toward the second body 2. The outlet cover may face the second body 2. The outlet cover may be disposed at the top of the first body 1. The outlet cover may define the upper surface of the first body 1.

The outlet cover may be disposed to be spaced apart from and below the second body 2. The outlet cover may be spaced apart from the lower cover 22 of the second body 2. The outlet cover may be spaced apart from the lower cover 22 by a predetermined vertical distance m. The lower cover 22 may be spaced upward from the outlet cover by the predetermined distance m. The separation distance m between the lower cover 22 and the outlet cover may vary and may increase toward the outside of the first body 1. The outlet cover may be the outlet grille 18. For example, the outlet grille 18 may be inclined downward toward the outside of the first body 1, the lower cover 22 may be inclined upward toward the outside of the first body 1, and the separation distance m between the outlet grille 18 and the lower cover 22 may increase in a direction away from a center axis and toward the outside of the first body 1.

The guide wall 221 may be formed obliquely with respect to a radial direction of the second body 2. The guide wall 221 may be tilted with respect to the radial direction of the second body 2. The guide wall 221 may be inclined upward toward the edge.

The lower cover 22 may be convex downward. The guide wall 221 may be a curved surface. For example, the guide wall 221 may be convex downward. A curvature of the guide wall 221 may increase toward the edge of the second body 2. Accordingly, a discharge air flow may be generated along the guide wall 221 up to an edge of the lower cover 22 by the Coanda effect.

An angle Θ3*b* between the guide wall 221 and an outward radial direction of the second body 2 may be greater than zero. The angle Θ3*b* between the guide wall 221 and the outward radial direction of the second body 2 may be variable. The angle Θ3*b* between the guide wall 221 and the radial direction of the second body 2 may increase toward the edge of the guide wall 221.

An angle Θ3*a* between the outlet grille 18 and a radial direction of the first body 1 may be greater than zero. The angle Θ3*a* between the outlet grille 18 and the radial direction of the first body 1 may be greater than the angle Θ3*b* between the guide wall 221 and the radial direction of the second body 2. A difference between the angle Θ3*a*, which is formed by the outlet grille 18 and the radial direction of first body 1, and the angle Θ3*b*, which is formed by the guide wall 221 and the radial direction of the second body 2, may decrease toward the edge of the guide wall 221.

The outlet cover may be the outlet grille 18. The outlet grille 18 may consist of a plurality of vanes 181. A cross-sectional shape of the outlet grille 18 may correspond to a cross-sectional shape of the first body 1. For example, the first body 1 may have a cylindrical shape, and the outlet grille 18 may have annular shape corresponding to a top of the first body 1.

The outlet grille 18 may be connected to the first body 1 and the second body 2. The outlet grille 18 may connect the upper housing 16 of the first body 1 and the lower cover 22 of the second body 2. The outlet grille 18 may be connected to an edge of the upper housing 16. The outlet grille 18 may be connected to one end of the lower cover 22, such as a base of post 21.

The air cleaner 3 may include an inner body 15 disposed inside the upper housing 16. The inner body 15 may be disposed inside the upper housing 16, and may be connected to the edge of the upper housing 16. For example, an upper edge of the inner body 15 may be connected to an upper edge of the upper housing 16.

The inner body 15 may include an outlet passage 153. The inner body 15 may include an inner cover 152, which is an inner wall, and an inner housing 151, which is an outer wall. The outlet passage 153 may be defined by the inner cover 152 and the inner housing 151. The outlet passage 153 may be disposed between the inner cover 152 and the inner housing 151. For example, the inner body 15 may include a cylindrical inner cover 152, a cylindrical inner housing 151 having a greater diameter than the inner cover 152, and an annular outlet passage 153 formed between the inner cover 152 and the inner housing 151.

The outlet grille 18 may be disposed at an end of the outlet passage 153. For example, the outlet grille 18 may be disposed at an end of the outlet passage 153 that is disposed at an upper side or part of the first body 1.

The first body 1 and the second body 2 may be separated from each other. For example, the first body 1 may include a holder (or mount) 19 to fix the second body 2 to the first body 1. The holder 19 may be recessed downward from the upper surface of the first body 1. The holder 19 may be open on one side in the first body 1 to receive and coupled to a portion of second body 2. For example, the holder 19 may be open at the top of the first body 1.

The holder 19 may be disposed at an upper side or part of the first body 1. The holder 19 may be disposed at a position corresponding to a center of the first body 1. For example, the holder 19 may be formed in a cylindrical shape at the upper side of the first body 1, and may be disposed at a position corresponding to the center of the first body 1.

The holder 19 may include a holder base 192 and a holder wall 191. The holder wall 191 may have a shape corresponding to the first body 1. The holder 19 may be smaller than the first body 1. For example, the holder 19 may be formed in a substantially cylindrical shape corresponding to the first body 1 with a substantially cylindrical shape to be smaller than the first body 1.

The outlet grille 18 may be connected to the holder wall 191. The outlet grille 18 may be connected to the holder edge 194. The holder wall 191 may be formed higher than the height of a circumferential surface of the first body 1. The holder edge 194 may be positioned above the housing edge 161. The outlet grille 18 may be connected to the holder edge 194 and the housing edge 161. The vane 181 may be connected to the holder edge 194 and the housing edge 161. For example, the holder edge 194 may be formed higher than the housing edge 161, and the vane 181 may be obliquely connected from the holder edge 194 located at an upper position to the housing edge 161 located at a lower position.

The lower cover 22 may be connected to the holder edge 194. The lower cover 22 may extend from the holder edge 194. The guide wall 221 may extend outward from the holder edge 194 in the lateral direction. The outlet grille 18 and the guide wall 221 may be connected to form an acute angle at the holder edge 194. For example, the outlet grille 18 that is inclined downward toward the outside of the first body 1 and the guide wall 221 that is inclined upward toward the outside of the first body 1 may be connected at the holder edge 194 and may form an acute angle.

The second body 2 may include the post 21 that may be inserted into the holder 19 of the first body 1. The post 21 may have a shape corresponding to that of the opening defined by the holder 19, and may be smaller than the holder 19. The post 21 of the second body 2 may be inserted into and fixed to the holder 19. The holder wall 191 may be in contact with an outer surface of the post 21. For example, the post 21 may be formed in substantially cylindrical shape that is smaller than the holder 19, so as to be received in and fixed to the holder 19.

The holder 19 may include a guide column 193 to guide a coupling direction of the post 21. The guide column 193 may be disposed inside the holder 19. The guide column 193 may be formed on an inner wall of the holder 19. The guide column 193 may be provided in plurality. For example, a plurality of guide columns 193 may be in contact with the inner wall of the holder 19, and may be spaced apart from each other to be disposed at opposite positions. The pole 21 may include a recess to receive the guide column 193.

The second body 2 may include the hook 28 the is selectively coupled to or released from the first body so as to allow the second body 2 to be selectively detached from the first body 1. The hook 28 may be disposed inside the lower cover 22 adjacent to the post 21. The hook 28 may include a hook portion protruding to an outside of the post 21, and the hook portion may be fitted into an engaging portion formed on the inner wall of the holder 19. The second body 2 may include a hook button 281 disposed at the guide wall 221 to operate the hook portion of the hook 28. The hook button 281 may be disposed to face the first body 1. The hook button 281 may be disposed to face the outlet grille 18.

The second body 2 may include the plate 24 with a substantially flat upper surface. The second body 2 may include the upper plate 23 disposed between the lower cover 22 and the plate 24.

The indicator 26 may be disposed at an upper end of the second body 2. The indicator 26 may face upward. The indicator 26 may be provided on the upper plate 23. The indicator 26 may protrude from the upper plate 23 toward the plate 24. The indicator 26 may be inserted into the slot 241 formed in the plate 24.

A substrate 264 may be disposed at a bottom of the indicator 26. The substrate 264 may allow the indicator 26 to be operated. The substrate 264 may be connected to a controller.

The indicator 26 may be disposed over a button module 25. The indicator 26 and the button module 25 may be arranged side by side in an up-and-down or vertical direction. The indicator 26 may visually output an indication of the operation of the button module 25, such as to indicate a change in an operation state of the air cleaner 3 based on operation of the button module 25.

The button module 25 may be disposed at a lower end of the second body 2. The button module 25 may be disposed to face downward. The button module 25 may be disposed under the substrate 264. The button module 25 may be disposed at the lower cover 22. The button module 25 may define a section of the guide wall 221. An outer surface of the button module 25 may correspond to a slope of the guide wall 221. For example, the guide wall 221 may be inclined upward toward the outside of the first body 1, and the button module 25 may be disposed at an angle corresponding to an inclined angle of the guide wall 221. Accordingly, a discharge air flow moving along the guide wall 221 may reach the button module 25, allowing a user to adjust the operation state of the air cleaner 3 while feeling the intensity of discharged air with his or her hand.

The button module 25 may be connected to the substrate 264. The button module 25 may be connected to the controller. The button module 25 may be connected to the indicator 26. The button module 25 may change the operation state of the air cleaner 3. For example, when the user presses the button module 25, the operation of the air cleaner 3 may start or stop.

The button module 25 may be disposed adjacent to a circumferential end of the second body 2. The button module 25 may be disposed closer to the circumferential end of the second body 2 than the post 21 of the second body 2. The button module 25 may be located outward relative to the circumferential wall of the first body 1. For example, the button module 25 may be disposed adjacent to the circumferential end of the lower cover 22 to be easily reached by the user. Accordingly, the user may easily access the button module 25 even when the button module 25 is hidden from view.

The button module 25 may be disposed below the indicator 26. The substrate 264 may be disposed between the button module 25 and the indicator 26. The button module 25, the substrate 264, and the indicator 26 may be disposed side by side in the vertical direction. For example, the substrate 264 may be disposed under the indicator 26, and the button module 25 may be disposed under the substrate 264. Accordingly, the indicator 26 disposed at the top surface may allow the user to easily determine the position of the button module 25, which is hidden from view. Thus, an additional member connecting the button module 25 and the substrate 264 may not be required to operate the indicator 26. This may result in reducing the number of parts and achieving a simple structure.

The charging pad 271 may be provided on the upper plate 23. The charging pad 271 may protrude from the upper plate 23 toward the plate 24. The charging pad 271 may be inserted into the pad hole 242 formed in the plate 24. The charging coil 272 may be disposed under the charging pad 271. The charging coil 272 may be disposed between the lower cover 22 and the upper plate 23. The charging substrate 273 may be adjacent to the charging coil 272, and may be disposed under the upper plate 23.

A water collection channel may be formed in the upper plate 23. The water collection channel may be formed under the plate 24. The water collection channel may be formed between the plate 24 and the upper plate 23. The water collection channel may be formed by being recessed from the upper plate 23. The water collection channel may include the main water collection channel 231. The main water collection channel 231 may be disposed adjacent to a central portion of the upper plate 23.

The water collection channel may include the slot water collection channel 232. The slot water collection channel 232 may be formed along at least a portion of a circumference of the indicator 26. The slot water collection channel 232 may be disposed under the slot 241 formed in the plate 24. The slot water collection channel 232 may be disposed under an edge of the slot 241. Accordingly, liquid penetrated into a gap between the slot of the plate and the indicator may be collected in the slot water collection channel 232.

The water collection channel may include the pad water collection channel 233. The pad water collection channel 233 may be formed along the circumference of the charging pad 271. The pad water collection channel 233 may be disposed under the pad hole 242 formed in the plate 24. The pad water collection channel 233 may be disposed under an edge of the pad hole 242. The pad water collection channel 233 may be formed along at least a portion of the circumference of the charging pad 271.

Figure 7:
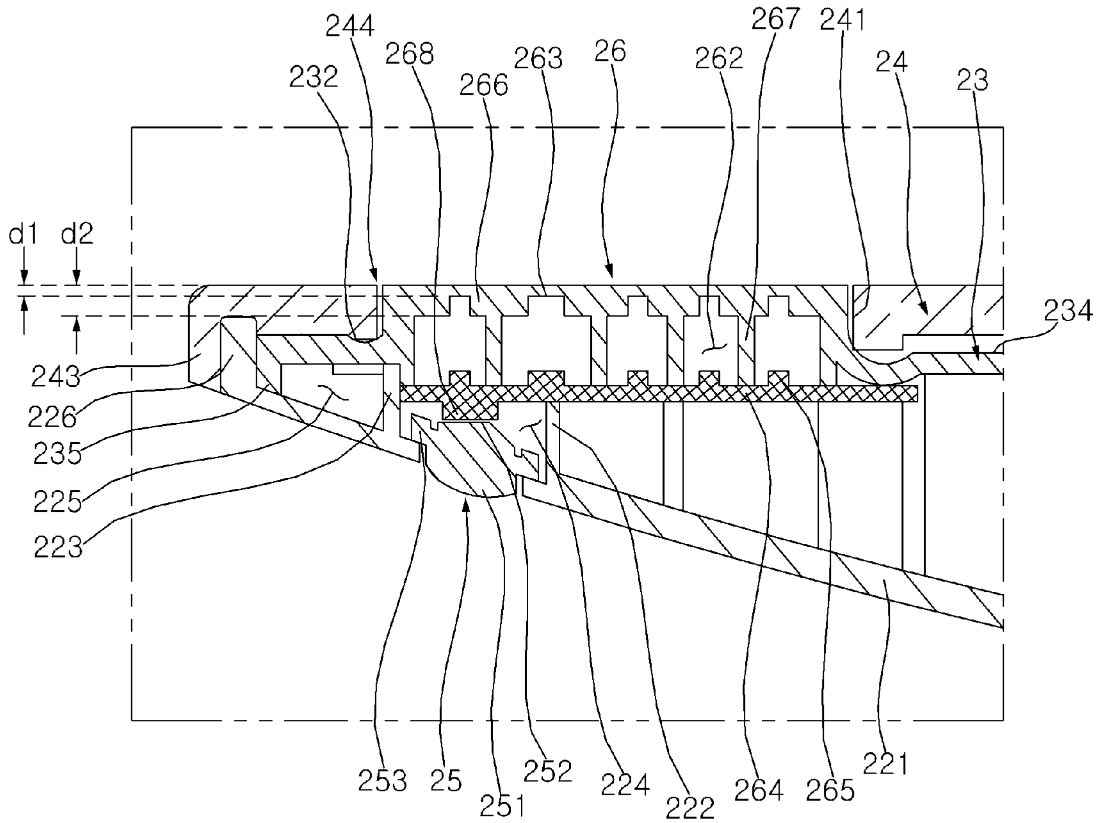
FIG. 7 is an enlarged cross-sectional view illustrating a dotted line portion of FIG. 6.

Referring to FIG. 7, aspects of the air cleaner 3 will be described below. The button module 25, the substrate 264, and the indicator 26 may be disposed side by side in the vertical direction. The button module 25, the substrate 264, and the indicator 26 may be arranged in a line in the vertical direction. For example, the indicator 26 may be inserted into the slot 241 of the plate 24 to define a portion of the upper surface of the plate 24, the substrate 264 may be disposed at the bottom of the indicator 26, and the button module 25 may be disposed to be in contact with a lower surface of the substrate 264.

The plate 24 may include the lateral cover 243 that defines a lateral surface of the second body 2. An end of the plate 24 may be bent to define the lateral cover 243. For example, the lateral cover 243 may be bent downward from the plate 24 that defines the upper surface of the second body 2.

The lateral cover 243 may cover a lateral portion of the lower cover 22. The lower cover 22 may include a lateral wall 226 formed by bending a lateral end thereof. The lateral cover 243 of the plate 24 may cover the lateral wall 226 of the lower cover 22. The lateral cover 243 of the plate 24 may be in contact with the lateral wall 226. The lateral wall 226 of the lower cover 22 may be bent in a direction opposite to a direction in which the lateral cover 243 of the plate 24 is bent. For example, the lateral cover 243 of the plate 24 may be bent to extend downward, and the lateral wall 226 of the lower cover 22 may be bent to extend upward.

The upper plate 23 may be disposed between the plate 24 and the lower cover 22. The upper plate 23 may include a hooking rib 235 formed by bending a lateral end thereof to be coupled to the lower cover 22. The hooking rib 235 may be bent in a direction corresponding to a direction in which the lateral cover 243 of the plate 24 is bent. The hooking rib 235 may be bent in a direction opposite to a direction in which the lateral wall 226 of the lower cover 22 is bent. For example, the lateral cover 243 and the hooking rib 235 may be bent to extend downward, and the lateral wall 226 may be bent to extend upward.

The hooking rib 235, the lateral wall 226, and the lateral cover 243 may be arranged sequentially from an inside to outside in the lateral direction. For example, the hooking rib 235 may be disposed to be in contact with an inner surface of the lower cover 22, and the lateral cover 243 may be disposed to be in contact with an outer surface of the lower cover 22. For example, the upper plate 23 may be in contact with the inner surface of the lower cover 22 by the hooking rib 235, and may be coupled from above to the lower cover 22. The plate 24 may be disposed over the lower cover 22, so that the lateral cover 243 covers the lateral wall 226 of the lower cover 22.

A gap 244 may be formed between the indicator 26 and the slot 241. Liquid may enter the gap 244 between the indicator 26 and the slot 241. The upper plate 23 may include the water collection channel for storing liquid introduced through the gap 244 between the indicator 26 and the slot 241. The water collection channel may be disposed at a peripheral portion of the slot 241. The water collection channel may be formed in the upper plate 23 in the form of a groove. The water collection channel may include the slot water collection channel 232 that is disposed under the slot 241 along the circumference of the indicator 26, the main water collection channel 231 (see FIG. 10) that is spaced apart from the central portion of the upper plate 23, and a connecting water collection channel 234 that connects the slot water collection channel 232 and the main water collection channel 231.

The indicator 26 may include the lamp housing 261. The lamp housing 261 may be elongated. The lamp housing 261 may include a hollow portion 262 in which a lamp 265 is disposed. The hollow portion 262 may be partitioned into a plurality of hollow portions 262 by a housing partition wall 267. A plurality of lamps (or lights) 265 may be provided in the lamp housing 261. For example, the lamp housing 261 may be partitioned into five hollow portions 262 by four housing partition walls 267, and five lamps 265 may be disposed in the respective hollow portions 262.

The lamp housing 261 may be open on one side from the hollow portion 262. The lamp 265 may be disposed on the opened side. The lamp 265 may be coupled to the substrate 264. The substrate 264 to which the lamp 265 is connected may be disposed on the open side of the lamp housing 261. The substrate 264 may be in contact with the opened side of the lamp housing 261 to close or cover the hollow portion 262. For example, the lamp housing 261 may be open downward from the hollow portion 262, and the substrate 264 to which the lamp 265 is connected may be disposed at a bottom of the lamp housing 261.

The lamp 265 may be disposed between the substrate 264 and the lamp housing 261. The lamp 265 may be disposed on the substrate 264 to face the hollow portion 262 so as to emit light. For example, the lamp 265 disposed at the bottom of the lamp housing 261 may emit light upward.

The lamp housing 261 may include a housing upper wall 266 that is inserted into the slot 241 of the plate 24. The housing upper wall 266 may define the upper surface of the plate 24. The housing upper wall 266 may have a shape corresponding to the slot 241 of the plate 24. The housing upper wall 266 may be a transparent or opaque material to transmit light from lamp 265.

A groove 263 may be formed in the housing upper wall 266 of the lamp housing 261. The groove 263 may be formed inside the housing upper wall 266. The groove 263 may be recessed from the hollow portion 262 to a direction opposite to the opening side of the lamp housing 261. The hollow portion 262 may be disposed between the groove 263 and the opening. For example, the lamp housing 261 may be open at the bottom, and the groove 263 may be recessed upward.

A thickness d1 of the housing upper wall 266 at the groove 263 may be less than a thickness d2 of the housing upper wall 266 away from the groove 263. The thickness d1 of the groove 263 may be a value obtained by subtracting a formation depth (d2-d1) of the groove 263 from the thickness d2 of the housing upper wall 266. Also, the thickness d1 of the groove 263 may be a thickness of the housing upper wall 266 at a position corresponding to a position of the groove 263. The thickness d1 of the housing upper wall 266 at the groove 263 may be greater than zero. Light emitted from the lamp 265 may pass through the groove 263 and then be directed to the outside. Accordingly, information of the operation state of the air cleaner may be visually displayed to a user, and liquid may be prevented from penetrating into the lamp housing.

The lamp 265 may be connected to the substrate 264. The lamp 265 may be disposed on the substrate 264. The plurality of lamps 265 may be disposed on the substrate 264 to be side by side in a longitudinal direction of the lamp housing 261. For example, FIG. 7 shows that five lamps 265 may be arranged in a row on the substrate 264, so as to be respectively disposed in five hollow portions 262 formed in the lamp housing 265.

The lamp 265 may be disposed below the groove 263 of the lamp housing 261. The lamp 265 and the groove 263 may be arranged in a line in the vertical direction. Light emitted from the lamp 265 may pass through the groove 263 located at an upper position and then spread to the outside.

The lamp housing 261 may be elevated from the upper plate 23. The lamp housing 261 may be integrated with the upper plate 23. The lamp housing 261 may protrude from the upper plate 23 to be inserted into the slot 241 to thereby define a portion of the upper surface of the plate 24.

The button module 25 may be in contact with the substrate 264. The button module 25, which defines a surface opposite to a surface on which the lamp 265 is disposed, may be in contact with the substrate 264. For example, the lamp 265 may be disposed on an upper surface of the substrate 264, and the button module 25 may be in contact with a lower surface of the substrate 264.

The substrate 264 may include a button sensor 268 in contact with the button module 25. The button sensor 268 may be a pressure sensor configured to sense pressure. For example, when a user presses the button 251, the button sensor 268 may sense pressure to transmit a command to the controller. The button module 25 may include a button rib 252 that extends toward and is in contact with the substrate 264. The button rib 252 may be in contact with the button sensor 268.

The lower cover 22 may include a button room (or button space) 224 in which the button module 25 is disposed. The lower cover 22 may include a first partition wall 222 and a second partition wall 223 that extend in the height direction of the first body 1. The first partition wall 222 and the second partition wall 223 may define sides of the button room 224 in which the button 251 is disposed. The first partition wall 222 and the second partition wall 223 may have different heights, such as to extend to sections of lower guide wall 221 at different heights from plate 24.

The first partition wall 222 may provide a first side of the button room 224, and may support the substrate 264. The first partition wall 222 may be disposed adjacent to one side of the button module 25. The second partition wall 223 may be disposed adjacent to another side of the button module 25.

The second partition wall 223 may provide a second side of the button room 224, and may support the upper plate 23. The second partition wall 223 and the guide wall 221 of the lower cover 22 may define a water collection portion 225 therein. The water collection portion 225 may be covered by the upper plate 23. Liquid that enters through the gap 244 between the slot 241 and the indicator 26 may be primarily stored in the slot water collection channel 232 of the upper plate 23, and liquid that overflows from the slot collection channel 232 and penetrates between the lateral wall 226 and the hooking rib 235 may be secondarily stored in the water collection portion 225. Accordingly, the waterproof performance of the air cleaner may be improved.

The lower cover 22 may include an opening formed at a bottom of the button room 224 to allow the button module 25 to be coupled thereto. As the button module 25 is inserted into the opening, the button 251 may be exposed to the outside.

The button module 25 may include a flange 253 seated on the guide wall 221 in the vicinity of the opening. The flange 253 may extend in a lateral direction of the button module 25. The flange 253 may be disposed at the button room 224, and the button 251 may be exposed to the outside. For example, the button module 25 may be received in the button room 224 from above, the flange 253 may be seated on the guide wall 221 in the vicinity of the opening, and the button 251 may be exposed downward, namely, to the outside.

Figure 8:
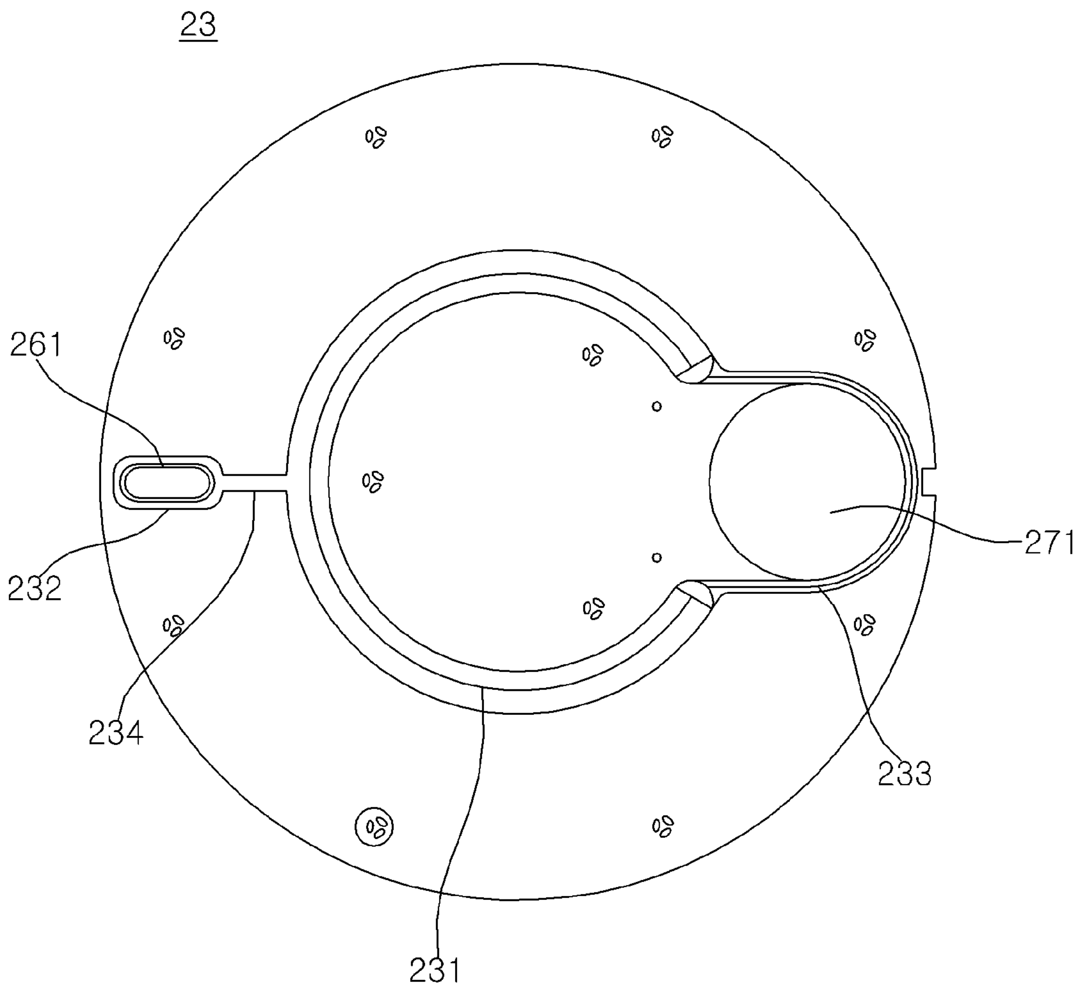
FIG. 8 is a top plan view of an upper plate according to an embodiment of the present disclosure.

Referring to FIG. 8, aspects of the upper plate 23 will be described below. The upper plate 23 may have a shape of the upper surface of the second body 2. The upper plate 23 may have, for example, a circular shape. The upper plate 23 may be a plate having a predetermined thickness. The upper plate 23 may include the lamp housing 261. The upper plate 23 may include the charging pad 271. The lamp housing 261 may be formed by protruding from the upper plate 23. The charging pad 271 may be formed by protruding from the upper plate 23.

The upper plate 23 may include the water collection channel. The water collection channel may be a groove formed in the upper plate 23. The water collection channel may be recessed downward from the upper plate 23. The water collection channel may include the main water collection channel 231 spaced apart from the central portion of the upper plate 23 in the lateral direction to be formed along a circumferential direction of the upper plate 23. For example, the main water collection channel 231 may be spaced apart from a central portion of a circular upper plate 23 to extend in a circumferential direction of the upper plate 23, and may be recessed downward.

The water collection channel may include the slot water collection channel 232 formed along at least a portion of the circumference of the lamp housing 261. The slot water collection channel 232 may be shallower than the main water collection channel 231. A width of the slot water collection channel 232 may be less than a width of the main water collection channel 231.

The water collection channel may include the pad water collection channel 233 formed along at least a portion of the circumference of the charging pad 271. The pad water collection channel 233 may be shallower than the main water collection channel 231. A width of the pad water collection channel 233 may be less than the width of the main water collection channel 231. The pad water collection channel 233 may be formed along a portion of the circumference of the charging pad 271, and may be connected to the main water collection channel 231. For example, the pad water collection channel 233 may be formed in a 'C' shape along a half of the circumference of the charging pad 271, and may be connected to the main water collection channel 231.

Referring to FIGS. 1 to 8, an air cleaner according to an aspect of the present disclosure includes: a first body having an inlet and an outlet; a filter disposed inside the first body and facing the inlet; a blower fan disposed between the inlet and the outlet inside the first body; a blower motor disposed inside the first body and configured to rotate the blower fan; and a second body coupled to an upper side of the first body and extending along a lateral direction. The second body includes an indicator configured to display an operation state. The indicator has a lamp configured to emit light and a lamp housing in which the lamp is disposed. The lamp housing has a groove to allow light emitted by the lamp to pass through.

According to another aspect of the present disclosure, the second body may be provided, on an upper surface thereof, with a slot into which the lamp housing is inserted, and the lamp housing may be inserted into the slot so as to be exposed at the upper surface of the second body. According to another aspect of the present disclosure, the lamp housing may include an upper wall that covers the lamp and is inserted into the slot to define the upper surface of the second body, and the groove may be formed in the upper wall of the housing.

According to another aspect of the present disclosure, the groove may be formed on a lower surface of the upper wall of the housing so as not to be exposed at the upper surface of the second body. According to another aspect of the present disclosure, the groove may be disposed above the lamp.

According to another aspect of the present disclosure, the indicator may include a substrate to which a lamp is connected, the lamp housing may have an opening that is open in a direction facing the substrate so as to allow the lamp to be disposed therein, the substrate may cover the opening, and the lamp may be disposed between the upper wall of the housing and the substrate. According to another aspect of the present disclosure, the lamp may be provided in plurality, and the lamp housing may include a housing partition wall disposed between the plurality of lamps.

According to another aspect of the present disclosure, the air cleaner may further include a button module to operate the indicator. The lamp housing may be inserted into the slot to define the upper surface of the second body, and the button module may be disposed below the indicator to define a lower surface of the second body.

According to another aspect of the present disclosure, the thickness of the second body may decrease toward an edge thereof, and the indicator and the button module may be disposed to be in contact with each other inside the second body. According to another aspect of the present disclosure, the second body may include: a lower cover extending in the lateral direction; and a plate disposed over the lower cover and defining the upper surface of the second body. The slot may be formed in the plate. According to another aspect of the present disclosure, the second body may further include an upper plate disposed between the lower cover and the plate, and the lamp housing may be formed by protruding from the upper plate.

According to another aspect of the present disclosure, the air cleaner may further include a charging pad formed by protruding from the upper plate. The plate may be provided with a pad hole at which the charging pad is disposed. According to another aspect of the present disclosure, the charging pad and the lamp housing may have different shapes.

According to another aspect of the present disclosure, the upper plate may include a slot water collection channel recessed downward along a circumference of the lamp housing. According to another aspect of the present disclosure, the upper plate may include: a main water collection channel spaced apart from a central portion of the upper plate and recessed downward in a circumferential direction of the upper plate; and a connecting water collection channel connecting the main water collection channel and the slot water collection channel.

According to another aspect of the present disclosure, the plate may include a lateral cover bent from the plate to cover the lower cover in the lateral direction, and the lower cover may include a lateral wall formed by bending a lateral end of the lower cover to be in contact with an inside of the lateral cover.

According to another aspect of the present disclosure, the air cleaner may further include an upper plate from which the lamp housing protrudes, and disposed between the plate and the lower cover. The upper plate may include a hooking rib formed by bending a lateral end of the upper plate to be in contact with an inside of the lateral wall, so as to be coupled to the lower cover.

It is an aspect of the present disclosure to solve the above and other problems. Another aspect of the present disclosure may be to improve the efficiency of an air cleaner. Another aspect of the present disclosure may be to provide an air cleaner that can allow a top space thereof to be utilized. Another aspect of the present disclosure may be to provide an air cleaner with improved waterproof performance. Another aspect of the present disclosure may be to provide an air cleaner with improved control convenience. Another aspect of the present disclosure may be to provide an air cleaner with improved installation convenience for a worker. The aspect of the present disclosure are not limited to the aspect described above, and other aspect not stated herein will be clearly understood by those skilled in the art from the description.

In accordance with an aspect of the present disclosure, an air cleaner includes: a first body having an inlet and an outlet; a filter disposed inside the first body and facing the inlet; a blower fan disposed between the inlet and the outlet inside the first body; a blower motor disposed inside the first body and configured to rotate the blower fan; and a second body coupled to an upper side of the first body and extending along a lateral direction, wherein the second body includes an indicator configured to display an operation state.

The indicator has a lamp configured to emit light and a lamp housing in which the lamp is disposed. The lamp housing has a groove to allow light emitted by the lamp to pass through. In some implementations, the second body may be provided, on an upper surface thereof, with a slot at which the lamp housing is disposed, and the lamp housing may be disposed at the slot. In some implementations, the indicator may include a substrate to which the lamp is connected.

In some implementations, the second body may include a lower cover extending in the lateral direction and a plate disposed over the lower cover and defining the upper surface of the second body. In some implementations, the slot may be formed on the plate.

In some implementations, an upper plate disposed between the lower cover and the plate may be further provided. In some implementations, the lamp housing may be formed by protruding from the upper plate. In some implementations, a charging pad formed by protruding from the upper plate may be further provided. In some implementations, the charging pad and the lamp housing may have different shapes.

According to at least one of the embodiments of the present disclosure, as a second body is disposed over a first body, space utilization may be improved. According to at least one of the embodiments of the present disclosure, as a second body has a flat top or upper surface, a top space of an air cleaner may be utilized. According to at least one of the embodiments of the present disclosure, a double-wall structure of a lateral cover of a plate and a lateral wall of a lower cover may improve the waterproof performance. According to at least one of the embodiments of the present disclosure, as a water collection channel is formed in an upper plate, the waterproof performance may be improved. According to at least one of the embodiments of the present disclosure, the waterproof performance may be improved due to a structure of a lamp housing that allows light to pass through without a through-hole. According to at least one of the embodiments of the present disclosure, as a button module is disposed at a guide wall through which discharge air flows, a user may feel the intensity of discharge air flow when manipulating the button module, allowing an operation state suitable for the user's preference to be maintained. According to at least one of the embodiments of the present disclosure, as an indicator and a charging pad are inserted into and coupled to a plate, an installation convenience for a worker may be improved. The aspects of the present disclosure are not limited to the aspects described above, and other aspects not mentioned will be clearly understood by those skilled in the art from the claims.

Certain embodiments or other embodiments of the disclosure described above are not mutually exclusive or distinct from each other. Any or all elements of the embodiments of the disclosure described above may be combined with another or combined with each other in configuration or function.

For example, a configuration "A" described in one embodiment of the disclosure and the drawings, and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings, and the appended claims. In addition to variations and modifications in the component parts and/or arrangements, alternative uses will also be apparent to those skilled in the art.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air cleaner comprising:

a first body having an inlet, an outlet, and a filter positioned between the inlet and the outlet; and a second body coupled to an upper side of the first body and extending laterally, wherein the second body includes an indicator light configured to display an indication of an operation state of the air cleaner, wherein the indicator light includes a plurality of lamps and a lamp housing in which the plurality of lamps are provided, and wherein the lamp housing includes a partition wall positioned between two of the plurality of lamps.

2. The air cleaner of claim 1, wherein the lamp housing has a groove through which light emitted by the lamp passes out of the lamp housing.

3. The air cleaner of claim 2, wherein the second body includes, on an upper surface thereof, a slot at which the lamp housing is provided, and wherein the lamp housing is provided at the slot so as to be exposed through the upper surface of the second body.

4. The air cleaner of claim 3, wherein the lamp housing includes an upper wall that covers the lamp and is provided at the slot to define a section of the upper surface of the second body, and wherein the groove is formed at the upper wall of the housing.

5. The air cleaner of claim 4, wherein the groove is formed on a lower surface of the upper wall of the housing so as not to be exposed outside of the second body at the upper surface of the second body.

6. The air cleaner of claim 4, wherein the groove is located above and vertically aligned with the lamp.

7. The air cleaner of claim 4, wherein the indicator light includes a substrate to which the lamp is connected, wherein the lamp housing has an opening that is open in a direction facing the substrate, and the lamp is positioned in the opening of the lamp housing, wherein the substrate covers the opening of the lamp housing, and wherein the lamp is provided between the upper wall of the lamp housing and the substrate.

8. The air cleaner of claim 3, further comprising a button module, wherein the lamp housing is provided at the slot to define a section of the upper surface of the second body, and wherein the button module is provided below the indicator light to define a section of a lower surface of the second body.

9. The air cleaner of claim 8, wherein a thickness of the second body decreases toward an edge thereof, and wherein the indicator light and the button module are provided to be in contact with each other inside the second body.

10. The air cleaner of claim 3, wherein the second body includes:

a lower cover extending laterally; and a top plate provided over the lower cover and defining the upper surface of the second body, and wherein the slot is formed on the top plate.

11. The air cleaner of claim 10, wherein the second body includes an intermediate plate provided between the lower cover and the top plate, and wherein the lamp housing protrudes upward from the intermediate plate.

12. The air cleaner of claim 11, further comprising a charging pad protruding from the intermediate plate, wherein the top plate includes a pad hole at which the charging pad is positioned.

13. The air cleaner of claim 11, wherein the intermediate plate includes a slot water collection channel recessed downward along at least a portion of a circumference of the lamp housing.

14. The air cleaner of claim 13, wherein the intermediate plate includes:

a main water collection channel spaced apart from a central region of the intermediate plate and recessed downward to extend in a circumferential direction; and a connecting water collection channel connecting the main water collection channel and the slot water collection channel.

15. The air cleaner of claim 12, wherein the charging pad and the lamp housing have different shapes when viewed from above.

16. The air cleaner of claim 10, wherein the top plate includes a lateral cover wall to cover a lateral surface of the lower cover, and wherein the lower cover includes a lateral wall extending from a lateral end of the lower cover to be in contact with an inside of the lateral cover wall.

17. The air cleaner of claim 16, further comprising an intermediate plate from which the lamp housing protrudes, the intermediate plate being positioned between the top plate and the lower cover, wherein the intermediate plate includes a hooking rib extending from a lateral end of the upper plate to be in contact with an inside of the lateral wall of the lower cover, so as couple the intermediate plate to the lower cover.

18. The air cleaner of claim 8, wherein the indicator light includes a substrate having a first surface facing the grove and on which the lamp is positioned, wherein the button module includes a button, and wherein the air cleaner further comprises a button sensor that is configured to detect when the button is pressed by a user and is connected to a second surface of the substrate.

* * * * *